United States Patent
Chen

(10) Patent No.: US 7,567,783 B1
(45) Date of Patent: Jul. 28, 2009

(54) I/Q MISMATCH CALIBRATION OF DIRECT CONVERSION TRANSCEIVERS USING THE OFDM SHORT TRAINING SEQUENCE

(75) Inventor: Jesse E. Chen, Sunnyvale, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 0 days.

(21) Appl. No.: 11/867,419

(22) Filed: Oct. 4, 2007

Related U.S. Application Data

(62) Division of application No. 11/105,235, filed on Apr. 13, 2005.

(51) Int. Cl.
*H04B 17/00* (2006.01)
*H04B 1/10* (2006.01)

(52) U.S. Cl. ............. 455/130; 455/67.13; 455/285; 455/295; 455/296; 455/302; 375/319; 375/346

(58) Field of Classification Search ........... 455/63.1, 455/67.13, 283–285, 295–296, 302, 313–317; 375/231, 319, 346–348
See application file for complete search history.

(56) References Cited

U.S. PATENT DOCUMENTS

| | | | |
|---|---|---|---|
| 6,252,912 B1 | 6/2001 | Salinger | |
| 6,337,888 B1 * | 1/2002 | Huang et al. | 375/322 |
| 6,628,926 B1 | 9/2003 | van de Beek et al. | |
| 6,977,977 B1 * | 12/2005 | Dubrovin et al. | 375/346 |
| 7,103,332 B2 * | 9/2006 | Choi et al. | 455/192.2 |
| 7,123,670 B2 * | 10/2006 | Gilbert et al. | 375/344 |
| 7,146,146 B2 * | 12/2006 | Masenten et al. | 455/296 |
| 7,158,586 B2 * | 1/2007 | Husted | 375/324 |
| 7,203,247 B2 | 4/2007 | Bauder et al. | |
| 7,215,716 B1 * | 5/2007 | Smith | 375/296 |
| 7,248,625 B2 * | 7/2007 | Chien | 375/219 |
| 7,274,750 B1 | 9/2007 | Mueller | |
| 7,324,609 B1 * | 1/2008 | Hwang et al. | 375/319 |
| 2002/0177425 A1 * | 11/2002 | Li | 455/296 |
| 2003/0184374 A1 | 10/2003 | Huang et al. | |
| 2004/0137869 A1 | 7/2004 | Kim | |
| 2004/0142667 A1 | 7/2004 | Lochhead et al. | |
| 2004/0203472 A1 | 10/2004 | Chien | |
| 2005/0041754 A1 | 2/2005 | Wu et al. | |
| 2005/0075815 A1 * | 4/2005 | Webster et al. | 702/106 |
| 2005/0118963 A1 * | 6/2005 | Chiu | 455/115.1 |
| 2005/0148304 A1 | 7/2005 | Jerng | |
| 2005/0163251 A1 | 7/2005 | McCallister | |
| 2005/0276354 A1 | 12/2005 | Su et al. | |
| 2006/0209993 A1 * | 9/2006 | Lu | 375/336 |
| 2008/0118004 A1 * | 5/2008 | Forenza et al. | 375/299 |

\* cited by examiner

*Primary Examiner*—Simon D Nguyen
(74) *Attorney, Agent, or Firm*—Withrow & Terranova, P.L.L.C.

(57) ABSTRACT

A system and method are provided for compensating for an I/Q mismatch of either a direct conversion transmitter or a direct conversion receiver based on known short training symbols of a Short Training Sequence (STS) of packets transmitted according to the IEEE 802.11a or 802.11g standard. To compensate for an I/Q mismatch of a direct conversion transmitter, a packet including the STS is transmitted. Due to the I/Q mismatch of the direct conversion transmitter, the transmitter distorts the packet to provide a distorted packet including a distorted STS. Based on one or more short training symbols of the distorted STS and a known ideal short training symbol, a distortion matrix is determined. Subsequent packets transmitted by the direct conversion transmitter are predistorted based on the distortion matrix. Compensation of the I/Q mismatch of a direct conversion receiver may be performed in a similar fashion.

7 Claims, 6 Drawing Sheets

I/Q MISMATCH CALIBRATION OF DIRECT CONVERSION TRANSCEIVERS USING THE OFDM SHORT TRAINING SEQUENCE

This application is a Divisional of U.S. patent application Ser. No. 11/105,235 filed Apr. 13, 2005, the disclosure of which is incorporated herein by reference in its entirety.

FIELD OF THE INVENTION

The present invention relates to direct conversion transceivers, and more particularly to baseband correction of an I/Q mismatch of a direct conversion transceivers.

BACKGROUND OF THE INVENTION

Most direct conversion radio frequency transceivers require baseband correction for I/Q mismatch. The transmitter up-converts a quadrature baseband signal to a radio frequency quadrature signal. More specifically, the transmitter includes a first mixer that mixes the in-phase component of the quadrature baseband signal with an in-phase component of a local oscillator signal to up convert the in-phase component of the baseband signal to the in-phase component of the radio frequency signal. Similarly, the transmitter includes a second mixer that mixes the quadrature component of the quadrature baseband signal with a quadrature component of a local oscillator signal to up convert the quadrature component of the baseband signal to the quadrature component of the radio frequency signal.

However, the gain of the first mixer may not be matched to the gain of the second mixer. As a result, a gain error is introduced into the radio frequency signal. In addition, the in-phase component and the quadrature component of the local oscillator signal used by the mixers for up-conversion may not be ninety degrees out-of-phase. As a result, a phase error, or quadrature error, is introduced into the radio frequency signal. Combined, the gain and quadrature errors form an I/Q mismatch of the transmitter. In a similar fashion, the receiver of the direct conversion receiver has an I/Q mismatch. It is desirable to correct the I/Q mismatch of the transmitter and/or receiver at baseband in order to provide improved performance.

Generally, baseband correction of the I/Q mismatch of either the transmitter or the receiver is performed based on a 2×2 distortion matrix defining a relationship between the actual I and Q components having been distorted by the I/Q mismatch of either the transmitter or receiver and the ideal I and Q components. However, the distortion matrix is not easily extracted, or calibrated. This is especially true for transceivers wherein the baseband processor, the transmitter, and the receiver are integrated into a single integrated circuit or module. In this case, the baseband inputs of the transmitter and receiver are not accessible by an external device. Thus, for transceivers operating according to IEEE 802.11a or 802.11g, the transmitter may only have Orthogonal Frequency Division Multiplexing (OFDM) packets available.

In the past, calibration was performed by providing a known complex tone to the baseband inputs of the transmitter. Then, the I/Q mismatch, and specifically the distortion matrix, of the transmitter was computed based the known complex tone and the output of the transmitter. The receiver was calibrated in a similar fashion. However, since these special test signals are not always available or economic, for many direct conversion transceivers, this method of calibrating the correction matrix is no longer viable.

Thus, there remains a need for a system and method for providing economic baseband correction of an I/Q mismatch of a direct conversion radio frequency transceiver.

SUMMARY OF THE INVENTION

The present invention provides a system and method for compensating for an I/Q mismatch of either a direct conversion transmitter or a direct conversion receiver based on a known waveform having a two-dimensional I versus Q trajectory such as the short training symbols of a Short Training Sequence (STS) of packets transmitted according to the IEEE 802.11a or 802.11g standard. For example, in order to compensate for an I/Q mismatch of a direct conversion transmitter, a packet including the STS is transmitted. Due to the I/Q mismatch of the direct conversion transmitter, the transmitter distorts the packet to provide a distorted packet including a distorted STS. Based on one or more short training symbols of the distorted STS and a known ideal short training symbol, a distortion matrix is determined. Subsequent packets transmitted by the direct conversion transmitter are pre-distorted based on the distortion matrix in order to compensate for the I/Q mismatch of the direct conversion transmitter.

A similar system and method is provided to compensate for an I/Q mismatch of a direct conversion receiver. In general, a packet including a STS having a series of short training symbols is received and processed by the direct conversion receiver to provide a distorted packet including a distorted STS. Based on one or more short training symbols of the distorted STS and a known ideal short training symbol, a distortion matrix is determined. Subsequent packets output by the direct conversion receiver are post-distorted based on the distortion matrix in order to compensate for the I/Q mismatch of the direct conversion receiver.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 5:
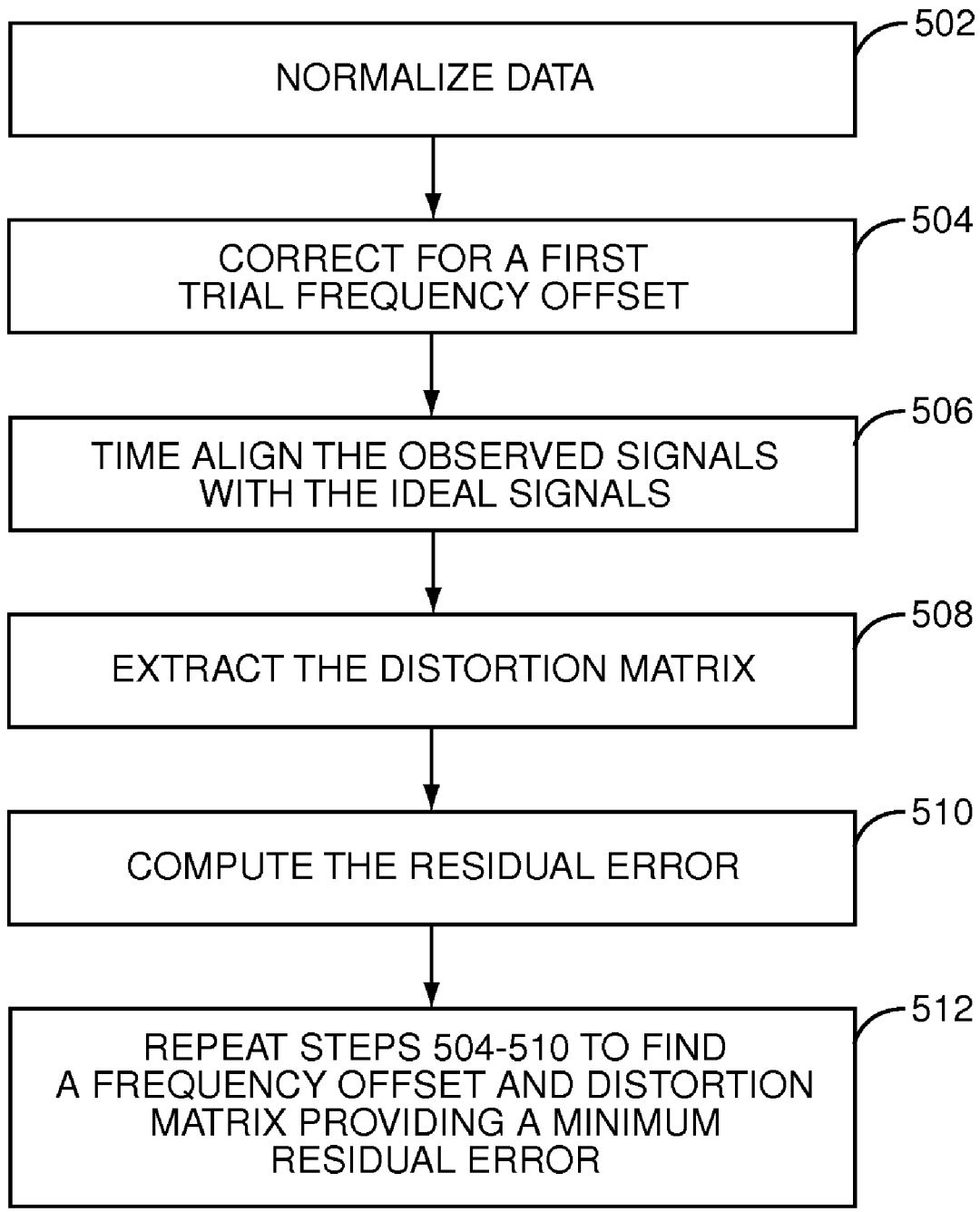
Figure 6:
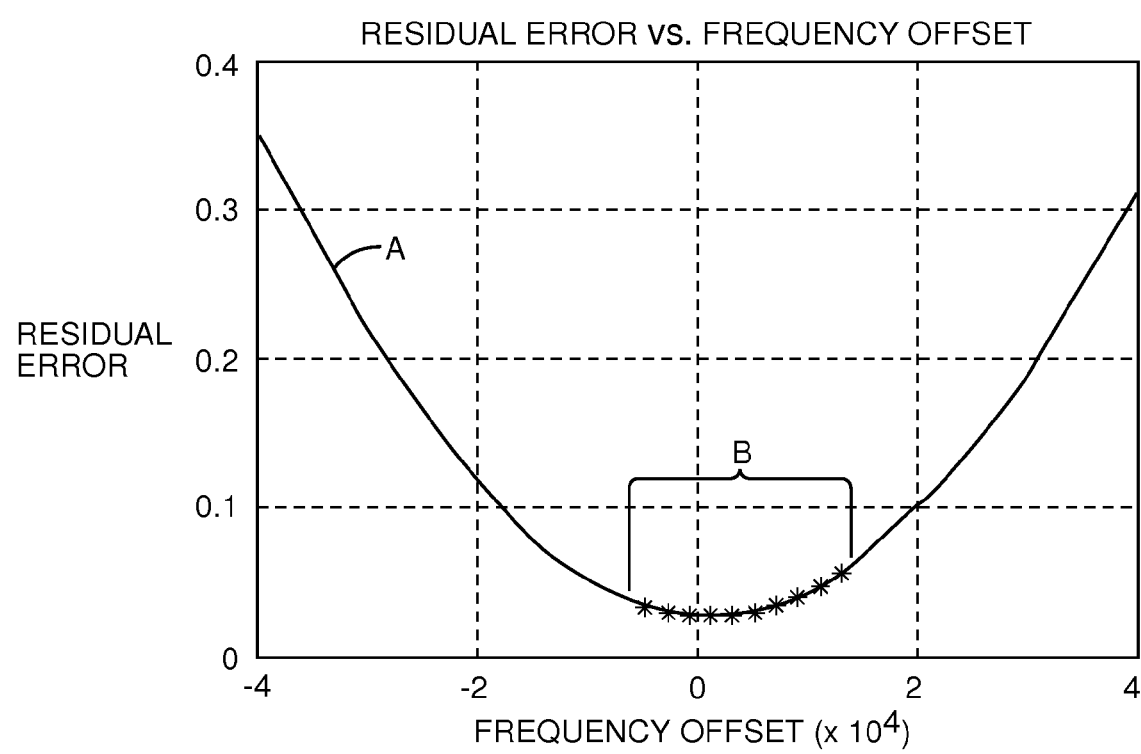

FIG. 5 illustrates a method of calibrating a distortion matrix used for baseband correction of the I/Q mismatch of a direct conversion transmitter or a direct conversion receiver based on comparing an ideal short training symbol to a short training symbol within a short training sequence of a packet having been distorted due to the I/Q mismatch of either the direct conversion transmitter or the direct conversion receiver; and FIG. 6 illustrates the operation of the method of FIG. 5 to search for a frequency offset that provides a distortion matrix having a minimum residual error according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
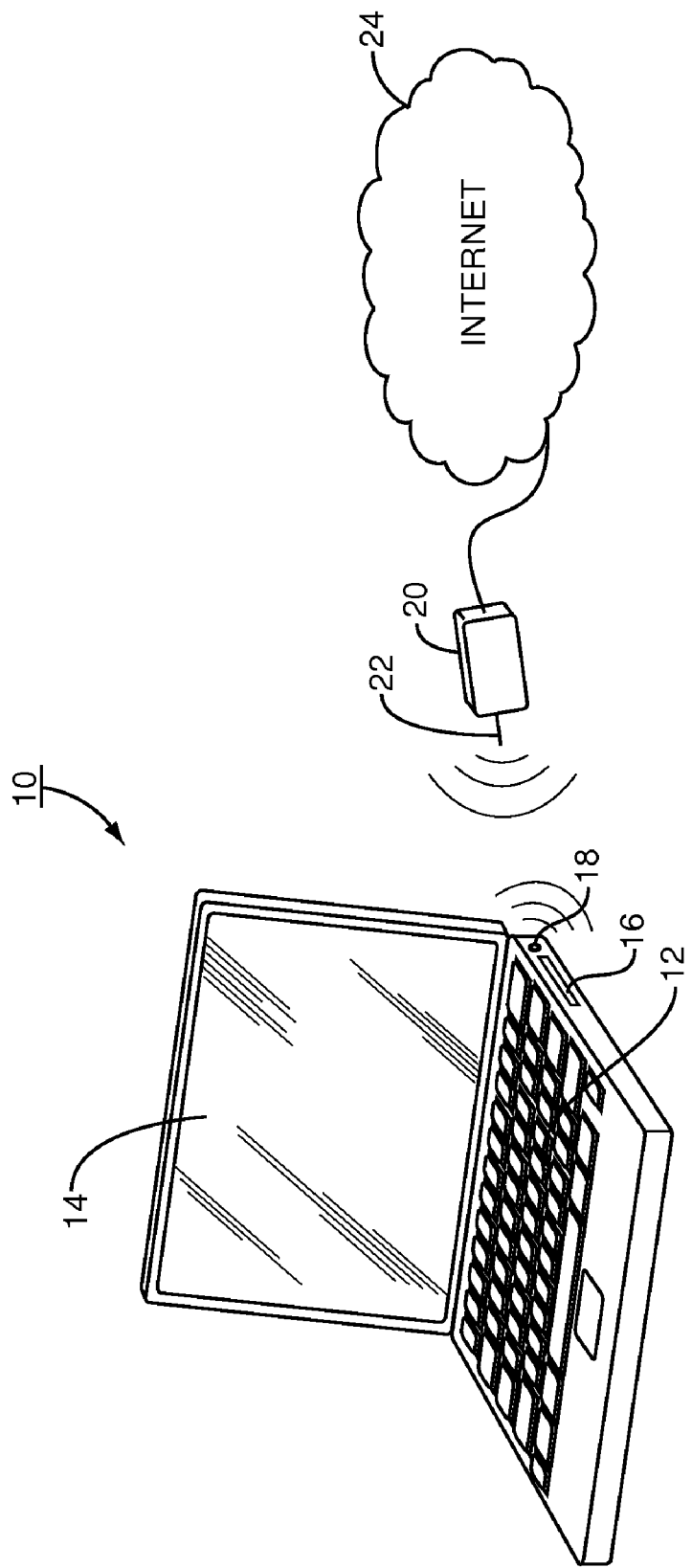
FIG. 1 illustrates a conventional laptop computer connected to the Internet via a 802.11 connection.

The present invention is preferably incorporated in a mobile terminal, such as a laptop computer, personal digital assistant, wireless Local Area Network (LAN) device, or the like. Mobile terminals such as laptop computer 10 in FIG. 1 are becoming more prevalent with each passing day. The laptop computer 10 may have a keyboard 12, a display 14, a disk drive 16, and other input/output devices as is well understood. The laptop computer 10 includes an antenna 18 for communicating wirelessly to a modem 20 using such standards as IEEE 802.11. The wirebased modem 20 may be a cable modem or the like and may incorporate a hub (not shown) with an antenna 22 that receives the wireless signals from the laptop computer 10. The wirebased modem 20 connects to the Internet 24 as is well understood. By providing the laptop computer 10 with a wireless modem and antenna 18, the designers allow users of the laptop computer 10 to improve the mobility and versatility of the laptop computer 10.

Figure 2:
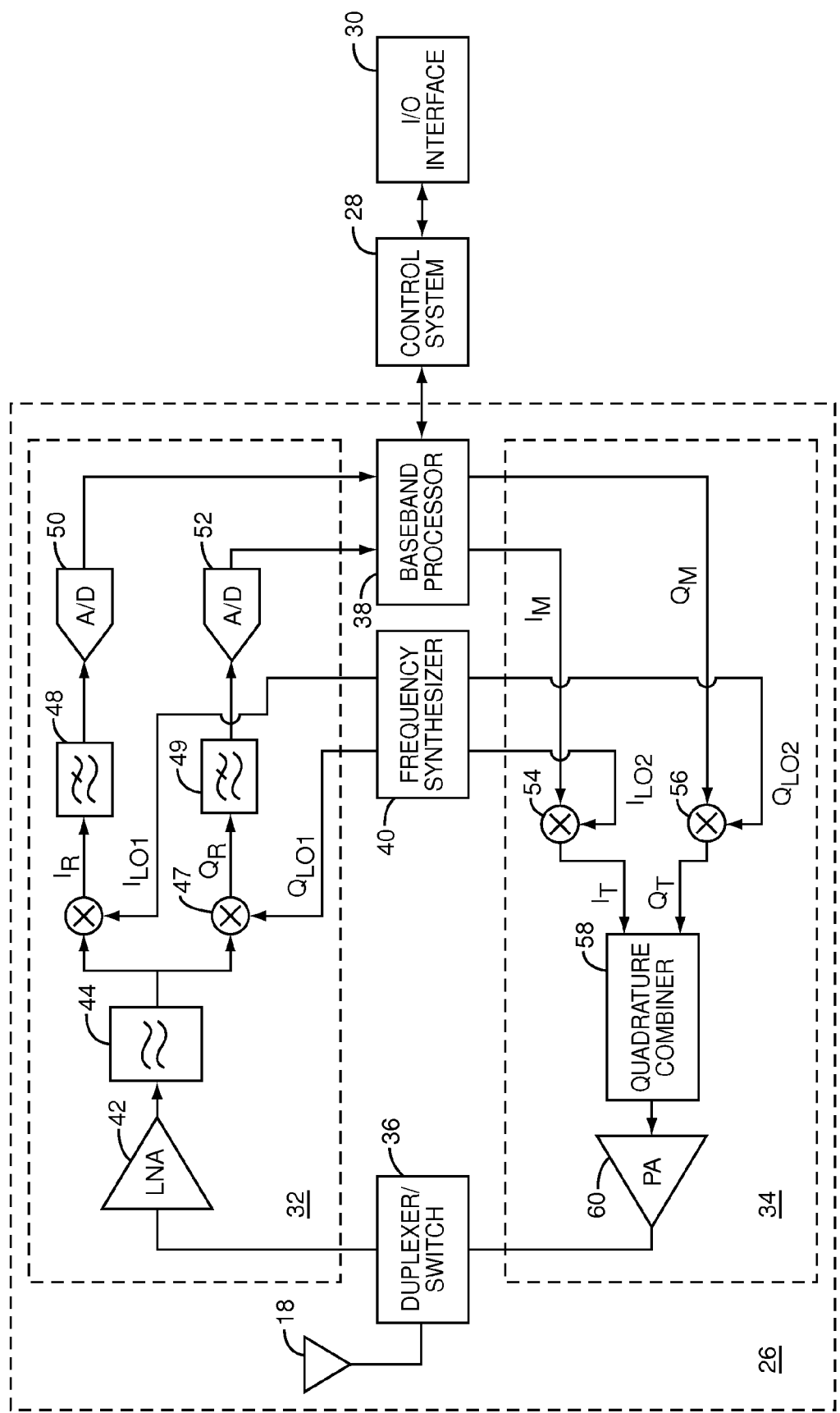
FIG. 2 illustrates a schematic diagram of a wireless modem according to one embodiment of the present invention.

FIG. 2 illustrates an exemplary wireless modem 26 including antenna 18 for use in the laptop computer 10 of FIG. 1. This embodiment is exemplary, and the wireless modem 26 may be incorporated into any device to provide wireless communication according to IEEE 802.11. In addition to the wireless modem 26, the laptop computer 10 includes a control system 28, which may be a microprocessor and associated operating system and the like as is well understood. The control system 28 is associated with an I/O interface 30 to receive inputs from a user and generate outputs for the user. For example, the I/O interface 30 may cooperate with the keyboard 12 and the display 14 as is well understood.

The wireless modem 26 includes a receiver front end 32, a radio frequency transmitter 34, the antenna 18, a duplexer or switch 36, a baseband processor 38, and a frequency synthesizer 40. The receiver front end 32 receives information bearing radio frequency signals from one or more remote transmitters such as another wireless modem. A low noise amplifier 42 amplifies the received signal, and a filter circuit 44 minimizes broadband interference in the received signal. Mixers 46 and 47 receive the received signal from the filter circuit 44 and operate to downconvert the radio frequency signal from a radio frequency to baseband, thereby providing a quadrature receive signal ($I_R$, $Q_R$) at baseband. Low-pass filters 48 and 49 filter the quadrature receive signal ($I_R$, $Q_R$) to remove high frequency components prior to digitization by analog-to-digital (A/D) converters 50 and 52.

More specifically, the mixer 46 mixes the radio frequency signal from the filter circuit 44 with an in-phase component ($I_{LO1}$) of a local oscillator frequency signal ($I_{LO1}$, $Q_{LO1}$) provided by the frequency synthesizer 40 to provide the in-phase component ($I_R$) of the quadrature receive signal ($I_R$, $Q_R$). The mixer 47 mixes the radio frequency signal from the filter circuit 44 with a quadrature component ($Q_{LO1}$) of the local oscillator frequency signal ($I_{LO1}$, $Q_{LO1}$) to provide the quadrature component ($Q_R$) of the quadrature receive signal ($I_R$, $Q_R$). The frequency of the local oscillator frequency signal ($I_{LO1}$, $Q_{LO1}$) is essentially equal to a center frequency of the received radio frequency signal such that the mixers 46 and 47 provide the quadrature receive signal ($I_R$, $Q_R$) at baseband. The quadrature receive signal ($I_R$, $Q_R$) filtered by low-pass filters 48 and 49 and digitized by A/D converters 50 and 52. The digitized quadrature receive signal ($I_R$, $Q_R$) is provided to the baseband processor 38.

The baseband processor 38 processes the digitized quadrature baseband signal ($I_R$, $Q_R$) to extract the information or data bits conveyed in the received signal. This processing typically comprises demodulation, decoding, and error correction operations. As such, the baseband processor 38 is generally implemented in one or more digital signal processors (DSPs).

On the transmit side, the baseband processor 38 receives digitized data from the control system 28, which it encodes for transmission. After encoding the data from the control system 28, the baseband processor 38 modulates the encoded data according to a predetermined modulation scheme. In one embodiment, the modulation scheme is Orthogonal Frequency Division Multiplexing (OFDM), as defined in IEEE 802.11a/g. The baseband processor 38 then provides the modulated signal, hereafter referred to as a transmit signal, to the radio frequency transmitter 34. Within the radio frequency transmitter 34, mixers 54 and 56 operate to up-convert the transmit signal ($I_T$, $Q_T$) from the baseband processor 38 to a carrier frequency. More specifically, the mixer 54 mixes an in-phase component ($I_T$) of the transmit signal ($I_T$, $Q_T$) with an in-phase component ($I_{LO2}$) of a local oscillator frequency signal ($I_{LO2}$, $Q_{LO2}$) to provide an in-phase component ($I_{RF}$) of a radio frequency transmit signal ($I_{RF}$, $Q_{RF}$). The mixer 56 mixes a quadrature component ($Q_T$) of the transmit signal ($I_T$, $Q_T$) with a quadrature component ($Q_{LO2}$) of the local oscillator frequency signal ($I_{LO2}$, $Q_{LO2}$) to provide a quadrature component ($Q_{RF}$) of the radio frequency transmit signal ($I_{RF}$, $Q_{RF}$).

The in-phase component ($I_{RF}$) and the quadrature component ($Q_{RF}$) of the radio frequency transmit signal ($I_{RF}$, $Q_{RF}$) are combined by a quadrature combiner 58 to provide a combined transmit signal. The combined transmit signal is amplified by power amplifier circuitry 60 to a level appropriate for transmission from the antenna 18. A gain of the power amplifier circuitry 60 may be controlled by the control system 28 via the baseband processor 38 or solely by the baseband processor 38.

Although the mixers 46 and 47 of the receiver front end 32 are typically designed to have the same characteristics, the gain of the mixer 46 may not be equal to the gain of the mixer 47, thereby resulting in a gain error. In addition, the in-phase component ($I_{LO1}$) and the quadrature component ($Q_{LO1}$) of the local oscillator frequency signal ($I_{LO1}$, $Q_{LO1}$) are ideally 90 degrees out-of-phase. However, there is typically a phase error, also called quadrature error, due to inherent errors of the frequency synthesizer 40. Combined, the gain error and the quadrature error form an I/Q mismatch of the receiver front end 32.

In a similar fashion, although the mixers 54 and 56 of the radio frequency transmitter 34 are typically designed to have the same characteristics, the gain of the mixer 54 may not be equal to the gain of the mixer 56, thereby resulting in a gain error. In addition, the in-phase component ($I_{LO2}$) and the quadrature component ($Q_{LO2}$) of the local oscillator frequency signal ($I_{LO2}$, $Q_{LO2}$) are ideally 90 degrees out-of-phase. However, there is typically a phase error, also called quadrature error, due to inherent errors of the frequency synthesizer 40. Combined, the gain error and the quadrature error form an I/Q mismatch of the radio frequency transmitter 34.

The present invention provides a method of correcting the I/Q mismatch of either the receiver front end 32 or the radio frequency transmitter 34 within the baseband processor 38. More specifically, in order to compensate for the I/Q mismatch of the receiver front end 32, the baseband processor 38 may post-distort the digitized quadrature receive signal ($I_R$, $Q_R$) to compensate for the I/Q mismatch of the receiver front end 32. In another embodiment, in order to compensate for the I/Q mismatch of the radio frequency transmitter 34, the baseband processor 38 may pre-distort the quadrature transmit signal ($I_T$, $Q_T$) prior to transmission by the radio frequency transmitter 34 to compensate for the I/Q mismatch of the radio frequency transmitter 34.

When compensating for the I/Q mismatch of the receiver front end 32, the received radio frequency signal may be defined as:

$$RF(t) = I_{IN}\cos(\omega \cdot t) - Q_{IN}\sin(\omega \cdot t).$$

The local oscillator signal ($I_{LO1}$, $Q_{LO1}$) may be defined as:

$$I_{LO1} = 2\left(1 + \frac{\varepsilon}{2}\right)\cos\left(\omega \cdot t + \frac{\Delta\varphi}{2}\right),$$

and $$Q_{LO1} = -2\left(1 - \frac{\varepsilon}{2}\right)\sin\left(\omega \cdot t - \frac{\Delta\varphi}{2}\right),$$

where $\varepsilon$ is the gain mismatch error of the receiver front end 32 and $\Delta\varphi$ is the phase mismatch error of the receiver front end 32. By multiplying the radio frequency signal and the local oscillator signal ($I_{LO1}$, $Q_{LO1}$) and leaving only baseband terms due to filtering, the baseband quadrature signal may be defined as:

$$I_R = \frac{1}{2}(2+\varepsilon)\left(\cos\left(\frac{\Delta\varphi}{2}\right)I_{IN} + \sin\left(\frac{\Delta\varphi}{2}\right)Q_{IN}\right),$$

and $$Q_R = -\frac{1}{2}(-2+\varepsilon)\left(\sin\left(\frac{\Delta\varphi}{2}\right)I_{IN} + \cos\left(\frac{\Delta\varphi}{2}\right)Q_{IN}\right).$$

The IQ mismatch of the receiver front end 32 may be generally modeled with the following equivalent baseband operation:

$$\begin{pmatrix} I_R \\ Q_R \end{pmatrix} = K_{RX}\begin{pmatrix} I_{IN} \\ Q_{IN} \end{pmatrix},$$

where $$K_{RX} = \begin{pmatrix} K_{RX11} & K_{RX12} \\ K_{RX21} & K_{RX22} \end{pmatrix}.$$

Accordingly, $$K_{RX} = \begin{pmatrix} \frac{1}{2}(2+\varepsilon)\cos\left(\frac{\Delta\varphi}{2}\right) & \frac{1}{2}(2+\varepsilon)\sin\left(\frac{\Delta\varphi}{2}\right) \\ -\frac{1}{2}(-2+\varepsilon)\sin\left(\frac{\Delta\varphi}{2}\right) & -\frac{1}{2}(-2+\varepsilon)\cos\left(\frac{\Delta\varphi}{2}\right) \end{pmatrix}.$$

When compensating for the I/Q mismatch of the radio frequency transmitter 34, $I_{IN}$ and $Q_{IN}$ are equivalent to the in-phase component ($I_T$) and the quadrature component ($Q_T$) of the quadrature transmit signal ($I_T$, $Q_T$). The local oscillator signal ($I_{LO2}$, $Q_{LO2}$) may be defined as:

$$I_{LO2} = 2\left(1 + \frac{\varepsilon}{2}\right)\cos\left(\omega \cdot t + \frac{\Delta\varphi}{2}\right),$$

and $$Q_{LO2} = -2\left(1 - \frac{\varepsilon}{2}\right)\sin\left(\omega \cdot t - \frac{\Delta\varphi}{2}\right),$$

where in this case $\varepsilon$ is the gain mismatch error of the radio frequency transmitter 34 and $\Delta\varphi$ is the phase mismatch error of the radio frequency transmitter 34. By multiplying the quadrature transmit signal ($I_T$, $Q_T$) and the local oscillator signal ($I_{LO2}$, $Q_{LO2}$), leaving only radio frequency terms, and combining the quadrature signal components, the radio frequency signal may be defined as:

$$RF_T(t) = I_{IN} \cdot \left(1 + \frac{\varepsilon}{2}\right) \cdot \cos\left(\omega \cdot t + \frac{\Delta\varphi}{2}\right) - Q_{IN} \cdot \left(1 - \frac{\varepsilon}{2}\right) \cdot \sin\left(\omega \cdot t - \frac{\Delta\varphi}{2}\right).$$

The operation of the baseband processor may be defined as:

$$\begin{pmatrix} I_{RF} \\ Q_{RF} \end{pmatrix} = K_{TX} \begin{pmatrix} I_T \\ Q_T \end{pmatrix},$$

where $$K_{TX} = \begin{pmatrix} K_{TX11} & K_{TX12} \\ K_{TX21} & K_{TX22} \end{pmatrix}, \text{ and}$$

$K_{TX}$ is a distortion matrix defining a distortion of the radio frequency transmitter 34. As such, the distortion matrix $K_{TX}$ may be defined as:

$$K_{TX} = \begin{pmatrix} (1+\frac{\varepsilon}{2})\cos(\frac{\Delta\varphi}{2}) & (1-\frac{\varepsilon}{2})\sin(\frac{\Delta\varphi}{2}) \\ (1+\frac{\varepsilon}{2})\sin(\frac{\Delta\varphi}{2}) & (1-\frac{\varepsilon}{2})\cos(\frac{\Delta\varphi}{2}) \end{pmatrix}.$$

The present invention provides a method for computing the distortion matrix K, either $K_{RX}$ or $K_{TX}$, based on comparing a known input signal ($I_{IN}$, $Q_{IN}$) to the output signal ($I_{OUT}$, $Q_{OUT}$). Once the distortion matrix K is known, the inverse of the distortion matrix may be applied to either post-distort the received quadrature signal ($I_R$, $Q_R$) when compensating for the I/Q mismatch of the receiver front end 32 or to pre-distort the quadrature transmit signal ($I_T$, $Q_T$) when compensating for the I/Q mismatch of the radio frequency transmitter 34.

Figure 3A:
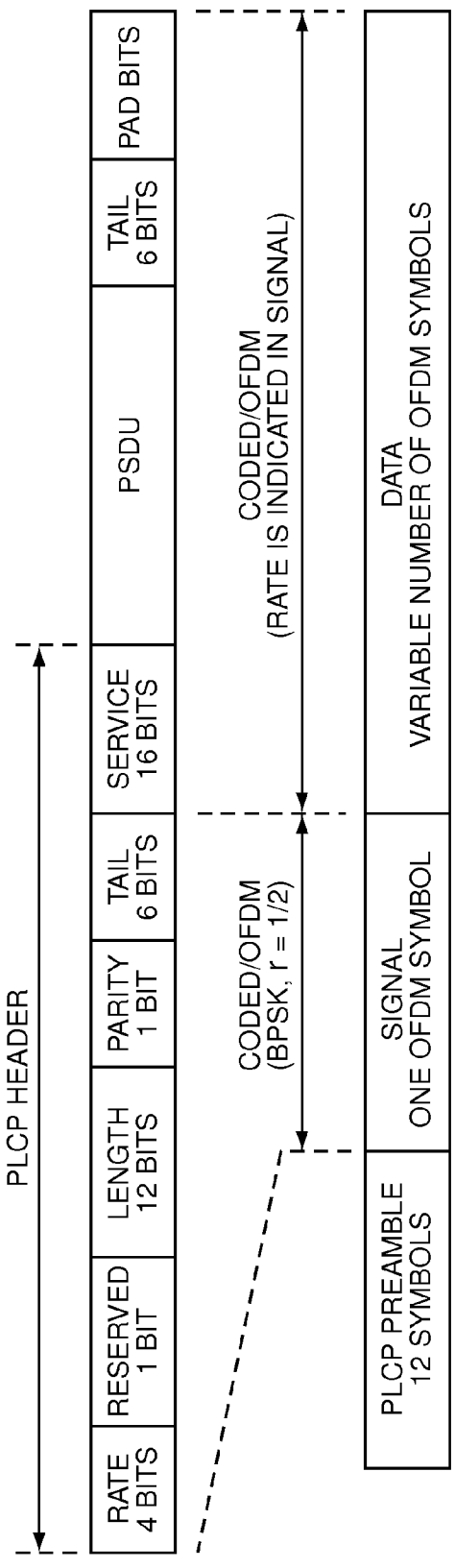
FIG. 3A illustrates a Physical Layer Convergence Protocol (PLCP) Protocol Data Unit (PPDU) frame format as defined in the IEEE 802.11a and 802.11g standards.
Figure 3B:
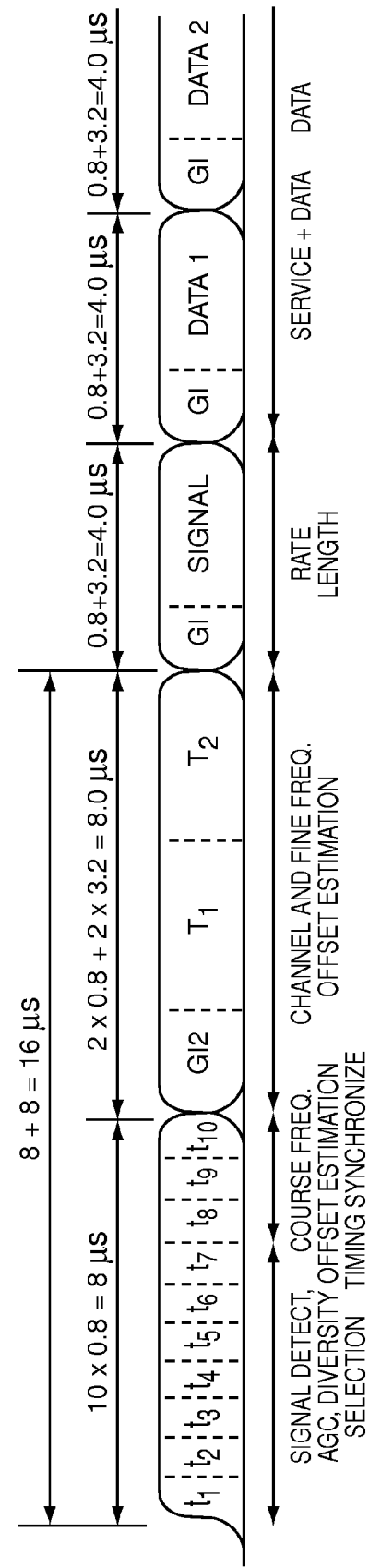
FIG. 3B is a more detailed illustration of the PLCP preamble of the PPDU frame format of FIG. 3A as defined in the IEEE 802.11a and 802.11g standards.

As shown in FIGS. 3A and 3B and discussed in the IEEE 802.11, 802.11a, and 802.11g specifications publicly available at http://www.ieee.org/, which are hereby incorporated by reference in their entireties, the 802.11a/g standards require transmission of Orthogonal Frequency Division Multiplexing (OFDM) packets according to a Physical Layer Convergence Protocol (PLCP) Protocol Data Unit (PPDU) frame format illustrated in FIG. 3A. The PPDU frame format includes a PLCP preamble, which is shown in more detail in FIG. 3B. At the beginning of the PLCP preamble, there is a Short Training Sequence (STS) including ten short training symbols ($t_1$-$t_{10}$). Each of the short training symbols ($t_1$-$t_{10}$) is a known symbol and is generated as described in the 802.11a and 802.11g specifications. As discussed below in detail, the present invention provides calibration of the distortion matrix K based on the short training symbols of the Short Training Sequence (STS). However, the present invention is not limited thereto. The present invention may provide calibration of the distortion matrix K based on any known waveform having a two-dimensional I versus Q trajectory (plot of I versus Q is not a straight line). Thus, although the description below focuses on the STS of the 802.11a and 802.11g standards, the present invention may be implemented in any wireless communication system wherein the associated wireless communication standard or protocol requires the transmission of known waveforms having a two-dimensional I versus Q trajectory.

Figure 4A:
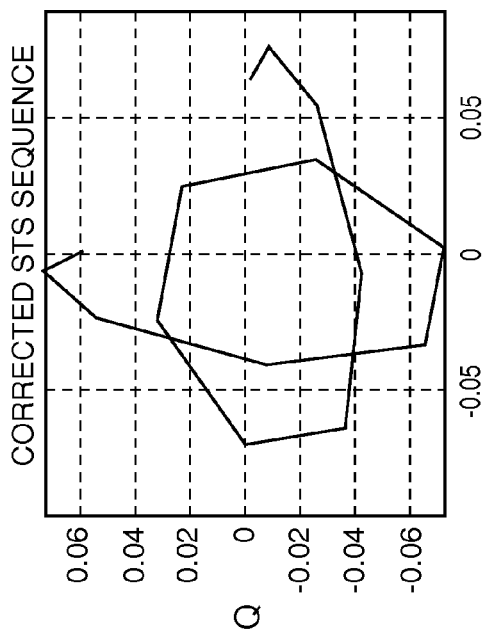
FIG. 4A illustrates an ideal short training symbol of the short training sequence (STS) of the PLCP preamble of FIG. 3B.
Figure 4B:
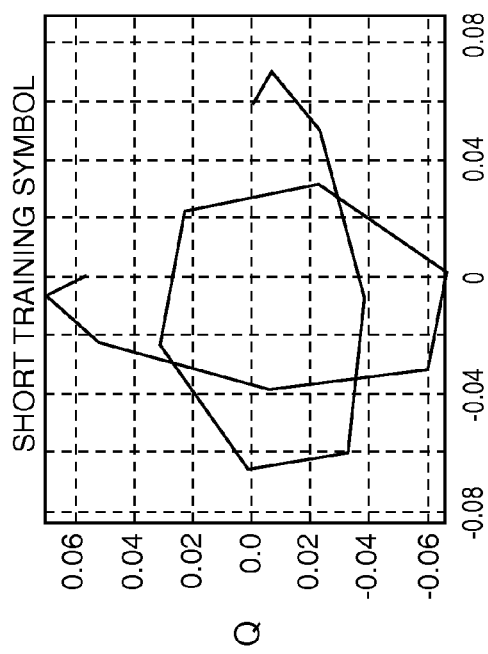
FIG. 4B illustrates an exemplary short training sequence wherein the short training symbols of the exemplary short training sequence have been distorted due to an I/Q mismatch of either a direct conversion transmitter or a direct conversion receiver.
Figure 4C:
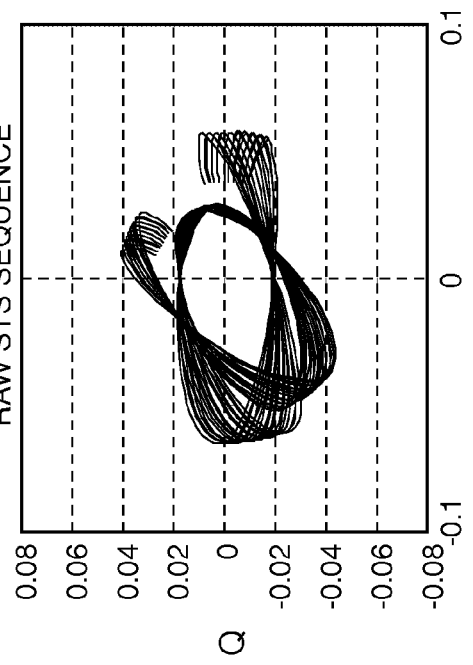
FIG. 4C illustrates a corrected version of the exemplary short training sequence of FIG. 4B having been compensated to substantially remove the distortion due to the I/Q mismatch according to one embodiment of the present invention.

FIG. 4A illustrates one of the short training symbols ($t_1$-$t_{10}$), referred to herein as an ideal short training symbol, as would be received by an ideal receiver having no I/Q mismatch; FIG. 4B illustrates an exemplary STS, or "raw" STS having been distorted due to the I/Q mismatch and frequency offset of either the receiver front end 32 or the radio frequency transmitter 34; and FIG. 4C illustrates the exemplary STS of FIG. 4B after correction according to the present invention.

Referring to FIG. 4A, since all of the short training symbols ($t_1$-$t_{10}$) are the same, the STS simply repeats the short training symbol illustrated in FIG. 4A ten times. However, due to the I/Q mismatch of either the receiver front end 32 or the radio frequency transmitter 34, the STS is distorted, as shown in FIG. 4B. The gain mismatch causes distortion, or "squishing," along the I or Q axis, and the quadrature error causes distortion along a diagonal from the first quadrant to the third quadrant or along a diagonal from the second quadrant to the fourth quadrant depending on whether the quadrature error is positive or negative. In addition, a frequency offset error between the local oscillator frequency (either LO1 or LO2) of the frequency synthesizer 40 and the carrier frequency causes a rotation, or "spinning," of the ideal short training symbol shown in FIG. 4A.

FIG. 4B illustrates the exemplary STS, hereafter referred to as a raw STS, having been distorted due to the I/Q mismatch and frequency offset of either the receiver front end 32 or the radio frequency transmitter 34. Since the ideal short training symbol of FIG. 4A is known, the short training symbols of the raw STS may be compared to the ideal short training symbol to compute the distortion matrix K. When determining the distortion matrix $K_{TX}$ of the radio frequency transmitter 34, the short training symbols of the raw STS transmitted from the radio frequency transmitter 34 may be downconverted by an external receiver, such as downconverters sold by Agilent or Yokogawa, having essentially no I/Q mismatch and then compared to the ideal short training symbol to compute the distortion matrix $K_{TX}$ of the radio frequency transmitter 34. Alternatively, if the receiver front end 32 has previously been calibrated to compensate for the I/Q mismatch of the receiver front end 32, the duplexer or switch 36 may simply couple the output of the radio frequency transmitter 34 to the input of the receiver front end 32. Thereafter, the baseband processor 38 or the control system 28 may perform a least squares fit to compute the distortion matrix K for the radio frequency transmitter 34 based on the transmitted short training symbols and the ideal short training symbol.

To determine the distortion matrix $K_{RX}$ for the receiver front end 32, a packet containing the STS may be transmitted from an external device, where the external device has been calibrated such that it has essentially no I/Q mismatch errors. Alternatively, if the radio frequency transmitter 34 is calibrated, the radio frequency transmitter 34 may transmit a packet containing the STS, and the duplexer or switch 36 may couple the output of the radio frequency transmitter 34 to the input of the receiver front end 32. Thereafter, the baseband processor 38 or the control system 28 may compute the distortion matrix $K_{RX}$ for the receiver front end 32 by comparing the short training symbols of the raw STS to the ideal short training symbol of FIG. 4A.

After computing the distortion matrix K, the inverse of the distortion matrix K may then be used to generate a corrected STS as illustrated in FIG. 4C. As illustrated, distortion of the corrected STS due to the I/Q mismatch and frequency offset is substantially reduced as compared to the raw STS of FIG. 4B.

FIG. 5 illustrates a method of computing the distortion matrix K based on an ideal short training symbol of the STS and the short training symbols of the raw STS. First, the method of FIG. 5 will be discussed with respect to computing the distortion matrix $K_{RX}$ of the receiver front end 32. Upon receiving a packet containing the STS from a transmitter, the receiver front end 32 generates the digitized quadrature receive signal ($I_R$, $Q_R$). The transmitter may be the radio frequency transmitter 34 having been previously calibrated to compensate for the I/Q mismatch of the radio frequency transmitter 34, or an external transmitter that has essentially no I/Q mismatch or has been calibrated to compensate for its I/Q mismatch. Due to the I/Q mismatch of the receiver front end 32, the short training symbols of the STS of the received packet contain a gain error and a quadrature error. In addition, there is generally a frequency offset between the frequency of the local oscillator frequency signal ($I_{LO1}$, $Q_{LO1}$) and the carrier frequency of the radio frequency (RF) signal received by the receiver front end 32. Accordingly, the receiver front end 32 provides a raw, or distorted, STS to the baseband processor 38.

According to the present invention, upon receiving the raw STS, the baseband processor 38 or, alternatively, the control system 28, may first normalize the known short training symbol to have essentially the same power as the short training symbols of the raw STS (step 502). Step 502 is not necessary for the present invention, but may provide improved performance. For conciseness, hereafter the method of FIG. 5 is described as being performed by the control system 28. However, it is to be understood that the method of FIG. 5 may be performed by the baseband processor 38 or the combination of the baseband processor 38 and the control system 28.

After normalizing the ideal short training symbol, ideal short training symbol is corrected using a first trial frequency offset (step 504). The first frequency offset may be zero or any other predetermined frequency offset. Next, the ideal short training sequence and the training symbols of the raw STS are time aligned (step 506). This may be done, for example, by correlating the ideal short training symbol with the raw STS in a manner that will be appreciated by one of ordinary skill in the art.

Next, the distortion matrix $K_{RX}$ is extracted using the normalized, frequency-corrected, time-aligned ideal short training symbol and the symbols of the raw STS (step 508). In one embodiment, the distortion matrix $K_{RX}$ is extracted by performing a least squares fit of the ideal short training symbol to one or more short training symbols of the raw STS. More specifically, the difference metric $\Psi$ may be defined as:

$$\Psi_I(K_{11}, K_{12}) = \sum_{n=1}^{N} (K_{11} \cdot I_{ideal,n} + K_{12} \cdot Q_{ideal,n} - I_{observed,n})^2, \text{ and} \quad (1)$$

$$\Psi_Q(K_{21}, K_{22}) = \sum_{n=1}^{N} (K_{21} \cdot I_{ideal,n} + K_{22} \cdot Q_{ideal,n} - Q_{observed,n})^2, \quad (2)$$

where $\Psi_I$ is an in-phase difference metric, $\Psi_Q$ is an quadrature difference metric, $I_{ideal}$ is the in-phase component of the frequency-corrected, time-aligned ideal short training symbol, $Q_{ideal}$ is the quadrature component of the frequency-corrected time-aligned ideal short training symbol, $I_{observed}$ is the observed, or measured, in-phase component of the short training symbol of the raw STS, and $Q_{observed}$ is the observed, or measured, quadrature component of the short training symbol of the raw STS.

The gradients of the difference metrics $\Psi_I$, $\Psi_Q$ are set to zero by setting the partial derivatives of the difference metrics $\Psi_I$, $\Psi_Q$ with respect to the values $K_{11}$-$K_{22}$ equal to zero. As a result, the partial derivates of Equation 1 yield:

$$\sum_{n=1}^{N} (I_{observed,n} \cdot I_{ideal,n}) = \quad (3)$$

$$K_{11} \cdot \sum_{n=1}^{N} (I_{ideal,n})^2 + K_{12} \cdot \sum_{n=1}^{N} (I_{ideal,n} \cdot Q_{ideal,n}), \text{ and}$$

$$\sum_{n=1}^{N} (I_{observed,n} \cdot Q_{ideal,n}) = \quad (4)$$

$$K_{11} \cdot \sum_{n=1}^{N} (I_{ideal,n} \cdot Q_{ideal,n}) + K_{12} \cdot \sum_{n=1}^{N} (Q_{ideal,n})^2.$$

The partial derivates of Equation 2 yield:

$$\sum_{n=1}^{N} (Q_{observed,n} \cdot I_{ideal,n}) = \quad (5)$$

$$K_{21} \cdot \sum_{n=1}^{N} (I_{ideal,n})^2 + K_{22} \cdot \sum_{n=1}^{N} (I_{ideal,n} \cdot Q_{ideal,n}), \text{ and}$$

$$\sum_{n=1}^{N} (Q_{observed,n} \cdot Q_{ideal,n}) = \quad (6)$$

$$K_{21} \cdot \sum_{n=1}^{N} (I_{ideal,n} \cdot Q_{ideal,n}) + K_{22} \cdot \sum_{n=1}^{N} (Q_{ideal,n})^2.$$

Accordingly, Equations 3 and 4 provide two equations and two unknowns: $K_{11}$ and $K_{12}$. As such, Equations 3 and 4 can be solved to provide values for $K_{11}$ and $K_{12}$. Equations 5 and 6 provide two equations and two unknowns: $K_{21}$ and $K_{22}$. As such, Equations 5 and 6 can be solved to provide values for $K_{21}$ and $K_{22}$. The values for $K_{11}$, $K_{12}$, $K_{21}$, and $K_{22}$ form the distortion matrix $K_{RX}$.

After extracting the distortion matrix $K_{RX}$, the residual error is computed (step 510). The residual error may be computed using Equations 1 and 2 and the values extracted for the distortion matrix $K_{RX}$. Thereafter, steps 506-510 are repeated to find a frequency offset and values for the distortion matrix $K_{RX}$ providing a minimum residual error (step 512). More specifically, for each iteration, the frequency offset used in step 504 is systematically adjusted to find the frequency offset and the values for the distortion matrix $K_{RX}$ providing the minimum residual error. In one embodiment, a coarse tuning process is used to find an approximate value of the frequency offset. Referring to FIG. 6, several iterations of steps 504-512 are performed where the frequency offset is coarsely adjusted to determine the general shape of curve A. Based on one or more lowest residual error values determined by coarsely adjusting the frequency offset, several iterations of steps 504-512 are performed where the frequency offset is finely adjusted over a range B to find the frequency offset and distortion matrix $K_{RX}$ providing the minimum residual error.

Once the frequency offset and distortion matrix $K_{RX}$ are determined according to the method of FIG. 5, the inverse of the distortion matrix $K_{RX}$ is used to correct, or post-distort, the quadrature receive signal ($I_R$, $Q_R$) during operation of the wireless modem 26 in order to compensate for the I/Q mismatch and frequency offset of the receiver front end 32.

The method of FIG. 5 may also, or alternatively, be used to determine the distortion matrix $K_{TX}$ for the radio frequency transmitter 34. The baseband processor 38 first transmits a packet containing the STS via the radio frequency transmitter 34, and the packet is received by a receiver. The receiver may be the receiver front end 32 having been previously calibrated to compensate for the I/Q mismatch of the receiver front end 32, or an external receiver that has essentially no I/Q mismatch or has been calibrated to compensate for its I/Q mismatch. Due to the I/Q mismatch of the radio frequency transmitter 34, the short training symbols of the STS of the transmitted packet contain a gain error and a quadrature error. In addition, there is generally a frequency offset due to a frequency offset between the frequency of the local oscillator frequency signal ($I_{LO2}$, $Q_{LO2}$) and desired carrier frequency of the transmitted RF signal. Accordingly, the STS packet transmitted by the radio frequency transmitter 34 is a raw, or distorted, STS.

According to the present invention, upon receiving the raw STS, a control system associated with the receiver may normalize the known short training symbol to have essentially the same power as the short training symbols of the raw STS (step 502). Step 502 is not necessary for the present invention, but may provided improved performance. As discussed above, the receiver may be an external receiver, and the control system performing the method of FIG. 5 may also external to the wireless modem 26 and laptop computer 10. Alternatively, the receiver may be the receiver front end 32, and the method of FIG. 5 may be performed by the baseband processor 38, the control system 28, or a combination thereof. For conciseness, hereafter the method of FIG. 5 is described as being performed by the control system 28.

After normalizing the ideal short training symbol, the short training symbols of the raw STS are corrected using a first trial frequency offset (step 504). Note that, in contrast, the frequency offset is applied to the ideal short training symbol when determining the distortion matrix $K_{RX}$ of the receiver front end 32. The first frequency offset may be zero or any other predetermined frequency offset. Next, the ideal short training sequence and the training symbols of the raw STS are time aligned (step 506). This may be done, for example, by correlating the ideal short training symbol with the raw STS in a manner that will be appreciated by one of ordinary skill in the art.

Next, the distortion matrix $K_{TX}$ is extracted using the normalized ideal short training symbol and the symbols of the raw STS (step 508). In one embodiment, the distortion matrix $K_{TX}$ is extracted by performing a least squares fit of the ideal short training symbol to one or more of the short training symbols of the raw STS. More specifically, the difference metric $\Psi$ may be defined as:

$$\Psi_I(K_{11}, K_{12}) = \sum_{n=1}^{N} (K_{11} \cdot I_{ideal,n} + K_{12} \cdot Q_{ideal,n} - I_{observed,n})^2, \text{ and} \quad (7)$$

$$\Psi_Q(K_{21}, K_{22}) = \sum_{n=1}^{N} (K_{21} \cdot I_{ideal,n} + K_{22} \cdot Q_{ideal,n} - Q_{observed,n})^2, \quad (8)$$

where $\Psi_I$ is an in-phase difference metric, $\Psi_Q$ is a quadrature difference metric, $I_{ideal}$ is the in-phase component of the ideal short training symbol, $Q_{ideal}$ is the quadrature component of the ideal short training symbol, $I_{observed}$ is the frequency-corrected and time-aligned observed, or measured, in-phase component of the short training symbol of the raw STS, and $Q_{observed}$ is the frequency-corrected and time-aligned observed, or measured, quadrature component of the short training symbol of the raw STS.

The gradients of the difference metrics $\Psi_I$, $\Psi_Q$ are set to zero by setting the partial derivatives of the difference metrics $\Psi_I$, $\Psi_Q$ with respect to the values $K_{11}$-$K_{22}$ equal to zero. As a result, the partial derivates of Equation 7 yield:

$$\sum_{n=1}^{N} (I_{observed,n} \cdot I_{ideal,n}) = \quad (9)$$

$$K_{11} \cdot \sum_{n=1}^{N} (I_{ideal,n})^2 + K_{12} \cdot \sum_{n=1}^{N} (I_{ideal,n} \cdot Q_{ideal,n}), \text{ and}$$

$$\sum_{n=1}^{N} (I_{observed,n} \cdot Q_{ideal,n}) = \quad (10)$$

$$K_{11} \cdot \sum_{n=1}^{N} (I_{ideal,n} \cdot Q_{ideal,n}) + K_{12} \cdot \sum_{n=1}^{N} (Q_{ideal,n})^2.$$

The partial derivates of Equation 8 yield:

$$\sum_{n=1}^{N} (Q_{observed,n} \cdot I_{ideal,n}) = \quad (11)$$

$$K_{21} \cdot \sum_{n=1}^{N} (I_{ideal,n})^2 + K_{22} \cdot \sum_{n=1}^{N} (I_{ideal,n} \cdot Q_{ideal,n}), \text{ and}$$

$$\sum_{n=1}^{N} (Q_{observed,n} \cdot Q_{ideal,n}) = \quad (12)$$

$$K_{21} \cdot \sum_{n=1}^{N} (I_{ideal,n} \cdot Q_{ideal,n}) + K_{22} \cdot \sum_{n=1}^{N} (Q_{ideal,n})^2.$$

Accordingly, Equations 9 and 10 provide two equations and two unknowns: $K_{11}$ and $K_{12}$. As such, Equations 9 and 10 can be solved to provide values for $K_{11}$ and $K_{12}$. Equations 11 and 12 provide two equations and two unknowns: $K_{21}$ and $K_{22}$. As such, Equations 11 and 12 can be solved to provide values for $K_{21}$ and $K_{22}$. The values for $K_{11}$, $K_{12}$, $K_{21}$, and $K_{22}$ form the distortion matrix $K_{TX}$.

After extracting the distortion matrix $K_{TX}$, the residual error is computed (step 510). The residual error may be computed using Equations 7 and 8 and the values extracted for the distortion matrix $K_{TX}$. Thereafter, steps 506-510 are repeated to find a frequency offset and values of the distortion matrix $K_{TX}$ providing a minimum residual error (step 512). More specifically, for each iteration, the frequency offset used in step 504 is systematically adjusted to find the frequency offset and the values for the distortion matrix $K_{TX}$ providing the minimum residual error. In one embodiment, a coarse tuning process is used to find an approximate value of the frequency offset. Referring to FIG. 6, several iterations of steps 504-512 are performed where the frequency offset is coarsely adjusted to determine the general shape of curve A. Based on one or more lowest residual error values determined by coarsely adjusting the frequency offset, several iterations of steps 504-512 are performed where the frequency offset is finely adjusted over a range B to find the frequency offset and distortion matrix $K_{TX}$ providing the minimum residual error.

Once the frequency offset and distortion matrix $K_{TX}$ are determined according to the method of FIG. 5, the inverse of the distortion matrix $K_{TX}$ is used to correct, or pre-distort, the quadrature transmit signal ($I_T$, $Q_T$) during operation of the wireless modem 26 in order to compensate for the I/Q mismatch and frequency offset of the radio frequency transmitter 34.

The present invention provides substantial opportunity for variation without departing from the spirit or scope of the present invention. For example, the distortion matrix K may alternatively be defined by the following equation:

$$\begin{pmatrix} I_{IN} \\ Q_{IN} \end{pmatrix} = K \begin{pmatrix} I_{OUT} \\ Q_{OUT} \end{pmatrix}.$$

As a result, the distortion matrix K is equal to the correction matrix used to either pre-distort the transmit signal or to compensate the received signal. As another example, the present invention is described above as calibrating the distortion matrix K using the short training symbols of the Short Training Sequence (STS) as defined in IEEE 802.11a and 802.11g. However, the present invention is not limited thereto. The present invention may be used in accordance with any wireless communication standard requiring the transmission of a known waveform having a two-dimensional I versus Q trajectory. As yet another example, the present invention may alternatively or additional be used to compute the gain error $\epsilon$ and the quadrature error $\Delta\phi$ of either the receiver front end 32 or the radio frequency transmitter 34. This may be done, for example, by first computing the distortion matrix K, and then computing the gain error $\epsilon$ and the quadrature error $\Delta\phi$ based on the equations given above that define the distortion matrix K in terms of the gain error $\epsilon$ and the quadrature error $\Delta\phi$.

Those skilled in the art will recognize improvements and modifications to the preferred embodiments of the present invention. All such improvements and modifications are considered within the scope of the concepts disclosed herein and the claims that follow.

What is claimed is:

1. A method of calibrating an I/Q mismatch of a direct conversion receiver comprising:
    receiving a packet comprising a known waveform having a two-dimensional I versus Q trajectory via a direct conversion receiver, wherein an I/Q mismatch of the direct conversion receiver distorts the known waveform such that the direct conversion receiver provides a distorted packet including an observed distorted waveform;
    determining a distortion matrix defining the distortion of the known waveform due to the I/Q mismatch of the direct conversion receiver based on the known waveform and the observed distorted waveform by:
        correcting the known waveform with a first trial frequency offset to provide a frequency-corrected known waveform;
        time aligning the frequency-corrected known waveform with the observed distorted waveform;
        computing a first distortion matrix based on a least squares fit of a distorted version of the frequency-corrected time aligned known waveform to the observed distorted waveform with respect to components of the distortion matrix applied to the frequency-corrected time aligned known waveform;
        determining a residual error based on the first trial frequency offset and the first distortion matrix;
    repeating the correcting, time aligning, computing, and determining the residual error steps for at least one additional trial frequency offset, thereby computing at least one additional distortion matrix; and
    selecting the distortion matrix and a desired frequency offset from the first and at least one additional trial frequency offsets and distortion matrices by selecting one of the first and at least one additional trial frequency offsets and distortion matrices having a minimum residual error; and
    compensating subsequent packets received by the direct conversion receiver based on the distortion matrix, thereby compensating for the I/Q mismatch of the direct conversion receiver.

2. The method of claim 1 wherein the known waveform is a short training symbol of a short training sequence contained in a preamble of the packet.

3. The method of claim 1 wherein determining the distortion matrix further comprises determining the distortion matrix based on the equation $$\begin{pmatrix} I_{OUT} \\ Q_{OUT} \end{pmatrix} = K \begin{pmatrix} I_{IN} \\ Q_{IN} \end{pmatrix},$$

where $$K = \begin{pmatrix} K_{11} & K_{12} \\ K_{21} & K_{22} \end{pmatrix},$$

wherein $I_{IN}$ and $Q_{IN}$ are a quadrature representation of a frequency-corrected version of the known waveform received by the direct conversion receiver, $I_{OUT}$ and $Q_{OUT}$ are a quadrature representation of the observed distorted waveform output from the direct conversion receiver, and K is the distortion matrix.

4. The method of claim 3 wherein compensating the subsequent packets received by the direct conversion receiver comprises determining a correction matrix by computing an inverse of the distortion matrix.

5. The method of claim 1 wherein determining the distortion matrix further comprises determining the distortion matrix based on the equation $$\begin{pmatrix} I_{IN} \\ Q_{IN} \end{pmatrix} = K \begin{pmatrix} I_{OUT} \\ Q_{OUT} \end{pmatrix},$$

where $$K = \begin{pmatrix} K_{11} & K_{12} \\ K_{21} & K_{22} \end{pmatrix},$$

wherein $I_{IN}$ and $Q_{IN}$ are a quadrature representation of a frequency-corrected version of the known waveform received by the direct conversion receiver, $I_{OUT}$ and $Q_{OUT}$ are a quadrature representation of the observed distorted waveform output from the direct conversion receiver, and K is a correction matrix.

6. The method of claim 1 wherein the packet is an Orthogonal Frequency Division Multiplexing (OFDM) packet and receiving the packet further comprises receiving the packet according to the IEEE 802.11a wireless standard.

7. The method of claim 1 wherein the packet is an Orthogonal Frequency Division Multiplexing (OFDM) packet and receiving the packet further comprises receiving the packet according to the IEEE 802.11g wireless standard.

* * * * *